UNITED STATES PATENT OFFICE.

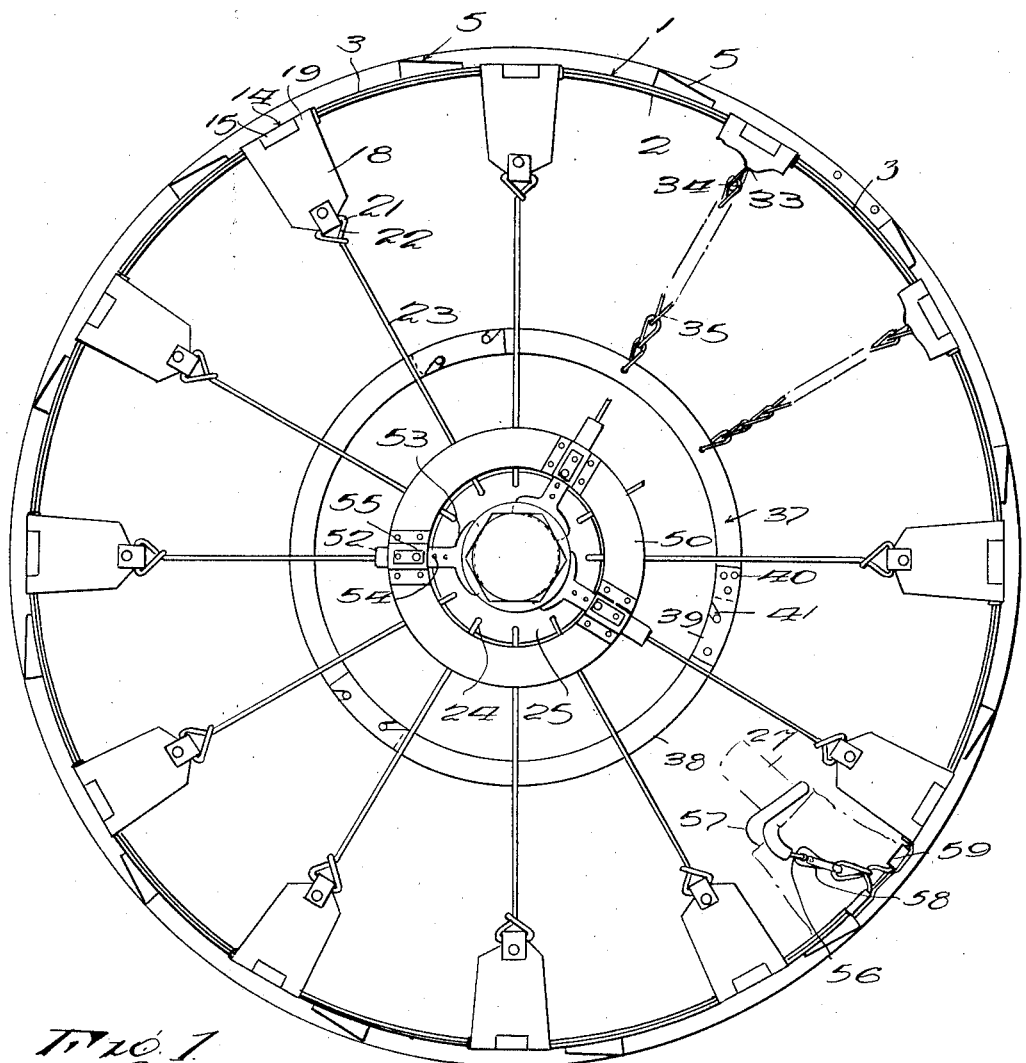

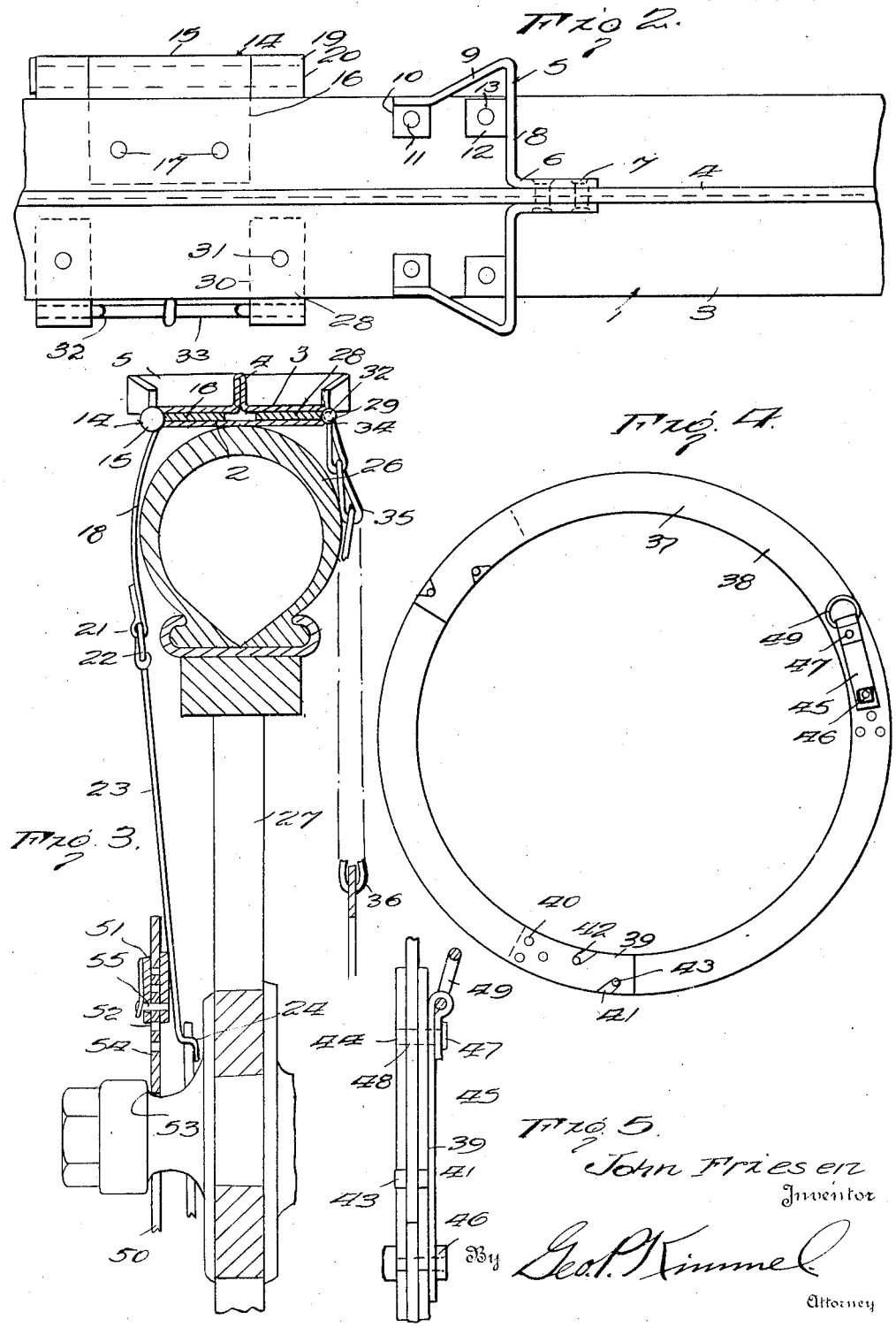

JOHN FRIESEN, OF LEHIGH, KANSAS.

TIRE-GUARD.

1,345,163. Specification of Letters Patent. Patented June 29, 1920.

Application filed February 1, 1919. Serial No. 274,393.

*To all whom it may concern:*

Be it known that I, JOHN FRIESEN, a citizen of Russia, residing at Lehigh, in the county of Marion and State of Kansas, have invented certain new and useful Improvements in Tire-Guards, of which the following is a specification.

The present invention comprehends generally improvements in that class of inventions known as resilient tires and wheels and more particularly relates to an improved tire guard.

It is the primary aim and object of this invention to provide a device of the above mentioned character designed to be removably arranged about a tire preferably of a pneumatic type for preventing skidding for facilitating the movement of the wheel over which the tire is arranged over muddy and sandy ground in addition of course to protecting the tire and thereby increasing the longevity thereof.

As an additional and equally important object this invention contemplates the provision of a device of the above mentioned character wherein the annular tread member is of novel construction being fitted with improved traction cleats while connected with the annular tread member is improved means for holding the same against accidental displacement from the tire, said means being positioned on opposite sides of the wheel which carries the tire.

The invention also embraces the provision of a device of the above mentioned character wherein improved hub engaging means is employed for preventing accidental displacement of the guard while acting in conjunction with the annular member is improved flexible spoke engaging means for preventing relative movement between the guard and the tire and wheel.

It is a more specific object to provide a device of the above mentioned character wherein the rear axle casing engaging ring is constructed in sections normally held in an engaged and a set-up position but collapsible to permit of a quick application or removal of the guard.

Among the other aims and objects of this invention may be recited the provision of a device of the above mentioned character with a view to compactness and wherein the number of parts are comparatively few, the construction simple, the cost of production low and the efficiency high.

The improvements in the details and arrangement of parts will be apparent from an inspection of the accompanying drawings, in connection with the specfic description hereinafter contained, and wherein the preferred embodiment of the invention is disclosed for the purpose of imparting a full understanding of the invention.

The invention is clearly illustrated in the accompanying drawings, in which:—

Figure 1 is a side elevational view of the improved guard,

Fig. 2 is an enlarged fragmentary top plan detail thereof,

Fig. 3 is an enlarged fragmentary cross sectional detail showing the guard applied about a tire and the wheel which receives the tire, Fig. 4 is an elevational detail of the rear axle casing engaging ring, and Fig. 5 is a fragmentary top plan detail of the retaining means for holding the inner ring sections together.

Similar characters of reference are employed in all of the above described views, to indicate corresponding parts.

Referring now, more particularly, to the accompanying drawings there is provided the improved annular tread member generally designated by the numeral 1 consisting of an inner rim 2 and an outer rim 3 arranged circumferentially and in contacting relation thereabout and formed medially of its side edges with a circumferential traction rib 4. To improve the traction of the wheel when traveling over soft or sandy soil, and also to prevent skidding action, there are provided cleats 5, which are arranged in pairs at intervals circumferentially of the annular member 1, and are disposed at opposite sides of the rib 4, on said member. In the present instance each traction cleat consists of an attaching portion 6 which is adapted to be positioned against one side of the rib 4 and secured thereto through the instrumentality of suitable fasteners 7, the fasteners acting to secure the attaching portion of the opposite cleat. The main portion 8 of the traction member is extended laterally from the rib and transversely of the outer rim contacting with the outer rim and lying flush with the rib. The main portion projects slightly beyond the side edge and is bent inwardly at an inclination as shown at 9, the terminal portion being arranged parallel with the rib and positioned near the adjacent side edge of the outer rim being also formed with an attaching flange 10 designed to be arranged between the inner and outer rims and secured in such position as by a fastening device 11. If desired, the main laterally extending portion may also be formed with an attaching flange 12 which is secured to the outer rim through the outer surface of the outer rim through the instrumentality of a fastener 13. It will thus be seen that the rib 4 and the traction cleats 5 coact to prevent a skidding action and incidentally prevent the wheel and tire upon which the guard is mounted from being stuck in mud holes et cetera.

As intimated, improved means has been provided for detachably connecting the annular member in position. In reducing this feature of the invention to practice a plurality of hinged elements generally designated by the numeral 14 are provided and arranged circumferentially about the annular member at one side thereof. Each hinged element consists of a hinged ear 15 from which projects juxtaposed attaching portions 16, the latter being like the flanges 10 arranged and secured between the inner and outer rims through the instrumentality of suitable fastening devices 17. Arcuate tire engaging plates 18 are now employed, the attaching ends terminating in spaced hinged ears 19 designed to be arranged on opposite sides and in alinement with the hinges 15 of the elements 14 and these alining ears are engaged by pintles 20 for swingably connecting the plates to the annular member 1. The inner end of each plate is designed to form a sleeve 21 in which is engaged the looped outer terminal 22 of a rod 23. As is apparent, these rods are arranged in radial relation with respect to each other and have their inner ends secured at 24 to a hub engaging ring 25. As is apparent from Fig. 3 the annular member 1 is arranged about a pneumatic tire 26 which is carried by the wheel 27, the retaining means just applied being adapted for positioning on the outer face of the wheel. Coacting with the plates 18, the rod 23 and the ring 25 is other retaining means adapted to be positioned on the opposite or inner side of the wheel 27 which in addition to facilitating the retention is designed to permit of quick application and removal of the tire guard to and from the wheel. In the present instance there is employed a plurality of hinge elements generally designated by the numeral 28 arranged desirably in spaced pairs circumferentially about the annular tread member. Each hinge element consists of a hinged ear 29 and juxtaposed attaching portions 30 which are arranged and secured between the inner and outer rims 2 and 3 through the instrumentality of fastening devices 31. The hinge elements 28 are preferably positioned opposite the hinged ears 19 of the plates 18 while a pintle 32 is rockably mounted in the adjacent pairs of hinged ears 29 and has its medial portion bent to form a substantial pump 33 while movably engaged with each pump portion is the outer link 34 of one of the chains 35, the inner links of which chain are connected as at 36 with the adjacent section of the improved collapsible sectional ring generally designated 37.

In the present instance, each section 38 of the ring 37 is arcuate in form and each has secured to one end spaced plates 39 preferably through the instrumentality of suitable fasteners 40. If desired, it is of course apparent that one end of each plate may be bifurcated. The plates 39 are formed on their outer and inner edges with opposed inwardly extending diagonal slots 41 and 42. Coacting with these slots are opposed pairs of spaced studs 43 which are integral with and project from opposite sides of the adjacent end portion of each section, the studs being designed for interlocking engagement with the slots. The opposed ends of two of the sections 38, instead of having their plates 39 formed with the outermost slots are provided near their outer ends with opposed openings 44. Suitable clutch means is now employed and consists of a resilient body 45 secured as at 46 to the last mentioned plate carrying at its outer end a locking pin 47 designed to be held in engagement with alining openings 44 and 48 in the adjacent sections thereby releasably locking the sections in a set-up position, the spring member 45 being tensioned to retain the locking or catch pin 47 against accidental displacement. A finger ring 49 is swingably connected with the outer end of the spring member 45 to facilitate removal of the locking pin 47 from engagement with the openings 44 and 48 when it is desired to collapse the ring 37 and remove the guard from position.

In order to prevent accidental displacement of the hub ring 25 another ring 50 is arranged about the hub and has mounted on its outer surface at suitably spaced intervals, brackets 51 positioned radially of the ring and slidably receiving the shanks or stems 52 of hub engaging clamps 53. The shanks are each formed with a longitudinal series of openings 54 in any of which the spring pawl 55 on the adjacent bracket 51 is adapted to engage for holding the adjacent clamp in clamping relation with the hub, before the ring 25 can be removed.

In order to prevent the annular member 1 from moving relative to the tire when the device is applied, a suitable flexible element such as a chain 56 is employed and is desirably covered with a piece of rubber tubing 57, the chain 56 having one end secured to one side of the annular member and its main portion about which the tube is arranged wrapped about the adjacent spoke of the wheel 27, the link at the free end of the element 56 being releasably engaged by a snap fastener 58 which is operably connected to the opposite side of the annular member 1 as shown at 59.

It is believed in view of the foregoing description that a further detailed description of the operation of the invention is entirely unnecessary. Likewise, it is believed that the advantages of the invention will be readily apparent.

Still further embodiments of the invention than those herein especially defined may be resorted to as conditions or preference may dictate, as may be in keeping with the hereto appended claims.

Having thus fully described the invention, what is claimed as new and desired to be secured by Letters Patent, is:—

1. The combination with a hub tap engaging ring of a tire guard, of another ring adapted for engagement with the hub of the wheel about which the guard is positioned, and hub clamping members mounted on the last mentioned ring for coacting with the first mentioned ring for preventing displacement of the guard.

2. A tire guard of the character described including a tread member adapted for engagement with a tire, a hub engaging ring, means connecting the tread member with the ring, a retaining ring arranged outwardly of the first mentioned ring, a plurality of guides carried by the retaining ring, and adjustable hub engaging and centering members carried by the guides.

3. A tire guard of the character described including an annular tread member engageable with a tire, a wheel hub engaging ring connected with the tread member, a retaining ring, a plurality of guides carried by the retaining ring, stems slidably mounted in said guides, enlarged hub engaging members carried by the terminals of the stems for engagement with a wheel hub, and means to lock the stems in various adjustable positions.

In testimony whereof I affix my signature hereto.

JOHN FRIESEN.